US011082240B2

(12) United States Patent
Yu

(10) Patent No.: US 11,082,240 B2
(45) Date of Patent: *Aug. 3, 2021

(54) RETRIEVING PUBLIC DATA FOR BLOCKCHAIN NETWORKS USING HIGHLY AVAILABLE TRUSTED EXECUTION ENVIRONMENTS

(71) Applicant: Advanced New Technologies Co., Ltd., Grand Cayman (KY)

(72) Inventor: Yirong Yu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,621

(22) Filed: Feb. 1, 2021

(65) Prior Publication Data

US 2021/0160083 A1 May 27, 2021

Related U.S. Application Data

(63) Continuation of application No. 16/944,115, filed on Jul. 30, 2020, now Pat. No. 10,911,244, which is a
(Continued)

(51) Int. Cl.
*H04L 29/06* (2006.01)
*H04L 9/32* (2006.01)
(Continued)

(52) U.S. Cl.
CPC .......... *H04L 9/3247* (2013.01); *G06F 21/71* (2013.01); *H04L 9/30* (2013.01); *H04L 9/3239* (2013.01); *H04L 2209/38* (2013.01)

(58) Field of Classification Search
CPC ... H04L 2209/38; H04L 9/3247; G06F 21/64; G06F 21/71
See application file for complete search history.

(56) References Cited

U.S. PATENT DOCUMENTS 7,698,398 B1 4/2010 Lai
8,069,435 B1 11/2011 Lai
(Continued)

FOREIGN PATENT DOCUMENTS

CN 101102257 1/2008
CN 101207613 6/2008
(Continued)

OTHER PUBLICATIONS

Ahmed et al., "Turing Trust Around: Smart Contract-Assisted Public Key Infrastructure," 17th IEEE International Conference on Trust, Security and Privacy in Computing and Communications, Aug. 2018, pp. 104-111.
(Continued)

*Primary Examiner* — Dao Q Ho
(74) *Attorney, Agent, or Firm* — Fish & Richardson P.C.

(57) ABSTRACT

Methods, systems, and apparatus, including computer programs encoded on computer storage media, for enhancing blockchain network security. Implementations include receiving a request for data from the data source, transmitting the request to a relay system that is external to the blockchain network and that includes a multi-node cluster including a plurality of relay system nodes, receiving a result provided from a relay system node, the result being digitally signed using a private key of the relay system node, verifying that the relay system node is registered, verifying an integrity of the result based on a public key of the relay system node and a digital signature of the result in response to verifying that the relay system node is registered, and transmitting the result to a client in response to verifying the integrity of the result.

18 Claims, 8 Drawing Sheets

Related U.S. Application Data continuation of application No. 16/587,470, filed on Sep. 30, 2019, now Pat. No. 10,805,089, which is a continuation of application No. PCT/CN2019/079800, filed on Mar. 27, 2019.

(51) Int. Cl.
*G06F 21/71* (2013.01)
*H04L 9/30* (2006.01)

(56) References Cited

U.S. PATENT DOCUMENTS

| | | | |
|---|---|---|---|
| 8,601,569 | B2 | 12/2013 | Segre et al. |
| 9,680,872 | B1 | 6/2017 | Roth et al. |
| 10,243,748 | B1 | 3/2019 | Callan |
| 10,250,395 | B1 | 4/2019 | Borne-Pons et al. |
| 10,671,372 | B2 | 6/2020 | Marks et al. |
| 10,708,068 | B2 | 7/2020 | Cheng et al. |
| 2006/0206616 | A1 | 9/2006 | Brown |
| 2007/0016788 | A1 | 1/2007 | Kakehi |
| 2007/0073876 | A1 | 3/2007 | Shima |
| 2011/0087887 | A1 | 4/2011 | Luft et al. |
| 2012/0017090 | A1 | 1/2012 | Gould et al. |
| 2016/0191524 | A1 | 6/2016 | Bathija et al. |
| 2017/0270319 | A1 | 9/2017 | Salmon-Legagneur et al. |
| 2017/0300898 | A1 | 10/2017 | Campero et al. |
| 2017/0346807 | A1 | 11/2017 | Blasi |
| 2017/0352027 | A1 | 12/2017 | Zhang et al. |
| 2017/0353309 | A1 | 12/2017 | Gray |
| 2017/0359184 | A1 | 12/2017 | Camenisch et al. |
| 2017/0372300 | A1 | 12/2017 | Dunlevy et al. |
| 2018/0089758 | A1 | 3/2018 | Stradling et al. |
| 2018/0097635 | A1 | 4/2018 | Moses |
| 2018/0191503 | A1 | 7/2018 | Alwar et al. |
| 2018/0204213 | A1 | 7/2018 | Zappier et al. |
| 2018/0219685 | A1 | 8/2018 | Deery et al. |
| 2018/0241572 | A1 | 8/2018 | Miele et al. |
| 2018/0254898 | A1 | 9/2018 | Sprague et al. |
| 2018/0287780 | A1 | 10/2018 | Safford et al. |
| 2018/0309567 | A1 | 10/2018 | Wooden |
| 2019/0005470 | A1 | 1/2019 | Uhr et al. |
| 2019/0034459 | A1 | 1/2019 | Qiu |
| 2019/0036682 | A1 | 1/2019 | Qiu |
| 2019/0036711 | A1 | 1/2019 | Qin |
| 2019/0058577 | A1 | 2/2019 | Bowman et al. |
| 2019/0058696 | A1 | 2/2019 | Bowman et al. |
| 2019/0116038 | A1 | 4/2019 | Sprague |
| 2019/0158275 | A1 | 5/2019 | Beck |
| 2019/0164153 | A1 | 5/2019 | Agrawal et al. |
| 2019/0164220 | A1 | 5/2019 | Raj et al. |
| 2019/0190724 | A1* | 6/2019 | Sundaresan ........... H04L 9/0637 |
| 2019/0207755 | A1 | 7/2019 | Gu et al. |
| 2019/0245693 | A1 | 8/2019 | Lyer et al. |
| 2019/0281028 | A1 | 9/2019 | Gillan et al. |
| 2019/0288854 | A1 | 9/2019 | Xie et al. |
| 2019/0303541 | A1 | 10/2019 | Reddy et al. |
| 2019/0305959 | A1 | 10/2019 | Reddy et al. |
| 2019/0311392 | A1 | 10/2019 | Swamidurai |
| 2019/0312863 | A1 | 10/2019 | Chow et al. |
| 2019/0372762 | A1 | 12/2019 | Shainski et al. |
| 2020/0067922 | A1 | 2/2020 | Avetisov et al. |
| 2020/0089915 | A1 | 3/2020 | Falk |
| 2020/0167770 | A1 | 5/2020 | Kurian et al. |

FOREIGN PATENT DOCUMENTS

| | | |
|---|---|---|
| CN | 103679436 | 3/2014 |
| CN | 107003916 | 8/2017 |
| CN | 107079036 | 8/2017 |
| CN | 108073829 | 5/2018 |
| CN | 108171083 | 6/2018 |
| CN | 108305170 | 7/2018 |
| CN | 108846776 | 11/2018 |
| CN | 107579826 | 12/2018 |
| CN | 108965342 | 12/2018 |
| CN | 109191108 | 1/2019 |
| CN | 208335190 | 1/2019 |
| CN | 109299338 | 2/2019 |
| CN | 109327512 | 2/2019 |
| CN | 109345259 | 2/2019 |
| EP | 2495932 | 7/2015 |
| EP | 3297206 | 3/2018 |
| JP | 2019008791 | 1/2019 |
| TW | 201812673 | 4/2018 |
| TW | M561279 | 6/2018 |
| TW | I636411 | 9/2018 |
| TW | 201837305 | 10/2018 |
| WO | WO 2013123548 | 8/2013 |
| WO | WO 2018193355 | 10/2013 |
| WO | WO 2016048575 | 3/2016 |
| WO | WO 2018052726 | 3/2018 |
| WO | WO 2018223042 | 12/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Ellis et al. [online]. "ChainLink a Decentralized Oracle Network," Sep. 2017, retrieved on Nov. 26, 2019, retrieved from URL<https://link.smartcontract.com/whitepaper>, 38 pages.
Extended European Search Report in European Application No. 19732212.6 dated Apr. 20, 2020, 11 pages.
Extended European Search Report in European Application No. 19732236.5, dated May 18, 2020, 8 pages.
Extended European Search Report in European Application No. 19770852.2, dated Sep. 8. 2020, 11 pages.
Extended European Search Report in European Application No. 19771586.5, dated Dec. 15, 2020, 9 pages.
Extended European Search Report in European Application No. 19772245.7, dated Sep. 8, 2020, 11 pages.
Github.com [online], "Ontology Oracle," Jan. 10, 2019, retrieved on Nov. 26, 2019, retrieved from URL <https://github.com/ontio/ontology-oracle>, 10 pages.
Nakamoto, "Bitcoin: A Peer-to-Peer Electronic Cash System," www.bitcoin.org, 2005, 9 pages.
PCT International Search Report and Written Opinion in International Appl. No. PCT/CN2019079800, dated Jan. 2, 2020, 7 pages.
PCT International Search Report and Written Opinion in International Appl. No. PCT/CN2019080478, dated Dec. 30, 2019, 9 pages.
PCT International Search Report and Written Opinion in International Appl. No. PCT/CN2019096030, dated Dec. 27, 2019, 6 pages.
PCT International Search Report and Written Opinion in International Appl. No. PCT/CN2019096032, dated Dec. 27, 2019, 6 pages.
PCT International Search Report and Written Opinion in International Appl. No. PCT/CN2019096036, dated Jan. 2, 2020, 7 pages.
Software.intel.com [online], "Add Enhanced Security to Your Application," 2019, retrieved on Nov. 26, 2019, retrieved from URL<https://software.intel.com/en-us/sgx/details>, 3 pages.
Software.intel.com [online], "Develop & Deliver More Secure Solutions," 2019, retrieved on Nov. 26, 2019, retrieved from URL<https://software.intel.com/en-us/sgx>, 5 pages.
Software.intel.com [online], "Enhanced Security Features for Applications and Data In-use," 2019, retrieved on Nov. 26, 2019, retrieved from URL<https://software.intel.com/sites/default/files/managed/c3/8b/intel-sgx-product-brief-2019.pdf>, 4 pages.
software.intel.com [online], "Intel Software Guard Extensions", 2019, retrieved on Nov. 26, 2019, retrieved from URL <https://software.intel.com/en-us/sgx>, 5 pages.
Wikipedia.org [online], "Authenticated Encryption," Mar. 2019, retrieved on Sep. 8, 2020, retrieved from URL<https://en.wikipedia.org/w/index.php?title=Authenticated_encryption&oldid=888979048>, 5 pages.

(56) References Cited

OTHER PUBLICATIONS

Wikipedia.org [online], "Trusted execution environment," Nov. 18, 2019, retrieved on Nov. 26, 2019, retrieved from URL<https://en.wikipedia.org/wiki/Trusted_execution_environment>, 6 pages.

Yoon et al., "Veiifying the Integrity of Private Transaction Information in Smart Contract using Homomorphic Encryption," IEEE Eurasia Conference on IOT, Communication and Engineering (ECICE), Oct. 2019, pp. 38-40.

Zhang et al., "Town Crier: An Authenticated Data Feed for Smart Contracts," The 23rd ACM Conference on Computer and Communications Security, Oct. 2016, 20 pages.

* cited by examiner

RETRIEVING PUBLIC DATA FOR BLOCKCHAIN NETWORKS USING HIGHLY AVAILABLE TRUSTED EXECUTION ENVIRONMENTS

CROSS-REFERENCE TO RELATED APPLICATIONS

This application is a continuation of and claims the benefit of priority of U.S. patent application Ser. No. 16/944,115, filed Jul. 30, 2020, which is a continuation of and claims the benefit of priority of U.S. patent application Ser. No. 16/587,470, filed Sep. 30, 2019, which is a continuation of PCT Application No. PCT/CN2019/079800, filed on Mar. 27, 2019, which are hereby incorporated by reference in their entirety.

TECHNICAL FIELD

This specification relates to providing data to a blockchain network from an external data source.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular use case. An example of a type of blockchain network can include consortium blockchain networks provided for a select group of entities, which control the consensus process, and includes an access control layer.

Smart contracts are programs that execute on blockchains. A smart contract contains a set of pre-defined rules under which the parties to that smart contract agree to interact with each other. If the pre-defined rules of the smart contract are met, the agreement defined in the smart contract is automatically enforced. A smart contract is usually tamper resistant and facilitates, verifies, and enforces the negotiation or performance of an agreement or transaction.

In some instances, the smart contract running within the blockchain network requires input from outside of the blockchain network to evaluate pre-defined rules and perform corresponding actions. However, the smart contract itself cannot directly access external data sources. Consequently, a relay agent can be used to retrieve external data and submit the data to the blockchain for processing by the smart contract. This process, however, can result in security issues, such as potential attack vectors (e.g., distributed denial-of-service (DDoS) attacks). Further, each client may be required to individually authenticate the remote agent, which hinders scalability, and increases resource overhead (e.g., processors, memory, bandwidth). In some instances, each request submitted by the client is processed by a certain relay agent that has been verified by the client. If the relay agent fails or is inaccessible, the client request cannot be processed correctly, resulting in unavailable service.

Although techniques have been proposed for addressing security and other issues associated with data retrieval from external data sources, a more effective solution to address these issues would be advantageous.

SUMMARY

This specification describes technologies for retrieval of data from external data sources for processing within a blockchain network.

Implementations of this specification are directed to a relay system including a multi-node cluster that is used to retrieve publicly available data and/or services from external data sources in a verifiable and highly available manner. In some implementations, remote attestation is performed for each of a plurality of relay system nodes in the multi-node cluster, the remote attestation resulting in a key pair (public key, private key) for each relay system node, respectively. Each relay system node operates using a trusted execution environment (TEE). A relay system smart contract is used for remote authentication of the relay system nodes, which can be audited publicly, eliminating the need for individual clients to repeat remote authentication. Authenticated relay system nodes are registered by the relay system smart contract for use. A status of each of the relay system nodes in the multi-node cluster can be periodically checked and recorded by a relay system controller. Each client request is assigned by the relay system controller to an available relay system node in the multi-node cluster for querying the external data source. A response that includes the result of the query is digitally signed using the private key of the relay system node. The response can be verified by the relay system smart contract as to whether it is sent by a registered relay system node. The integrity of the response can be verified by the relay system smart contract using the public key of the relay system node.

The subject matter described in this specification as provided in particular implementations realizes one or more of the following technical advantages. In some implementations, a multi-node cluster for retrieving or accessing data and/or services from the external data source is provided, where the status of relay system nodes in the multi-node cluster is periodically checked and recorded by a relay system controller. As described herein, with the relay system nodes being deployed in a cluster, the relay system controller can automatically assign client service request to an available relay system node in the cluster, avoiding service unavailability due to individual relay system node failure. As such, the implementations of this specification improve the overall service availability of the relay system for querying internet data source. In some implementations, the integrity of responses provided back to the blockchain network from external data sources is ensured. Accordingly, implementations of this specification improve the integrity of communications between a blockchain network, and components of a relay system that is used to retrieve data that is external to the blockchain network. In this manner, potential attack channels for malicious users are mitigated to enhance security. In some implementations, the relay system facilitates avoiding a direct contact between the user and the relay system node, thereby avoiding exposing a position or access point of the relay system node. As such, the relay system node is less likely to be found and attacked by malicious actors over the network in many forms, such as, for example, distributed denial of service (DDoS) attacks. This improves a security of the relay system node, thereby further improving a security of the communication between the blockchain network and the relay system node.

This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
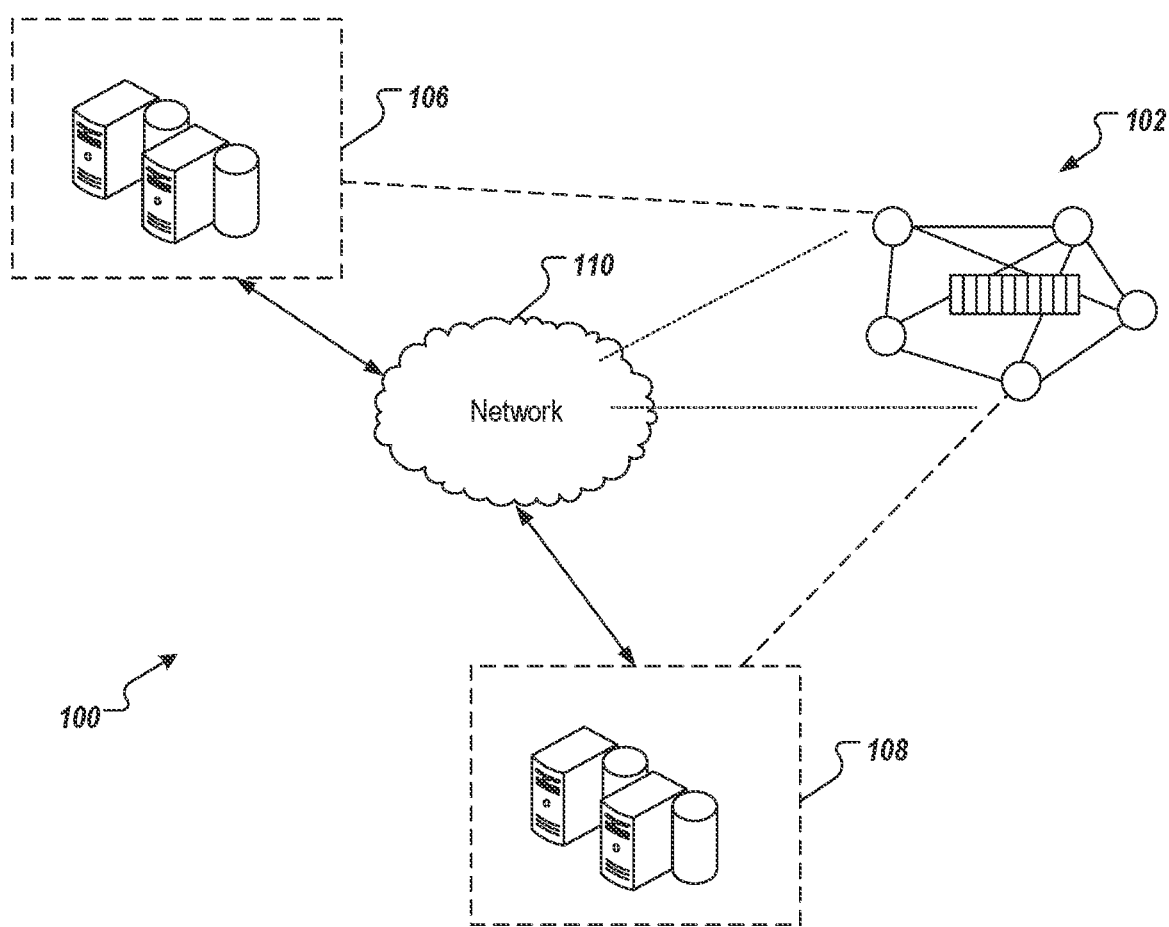
FIG. 1 is a diagram illustrating an example of an environment that can be used to execute implementations of this specification.

This specification describes technologies for retrieval of data from external data sources for processing within a blockchain network. Implementations of this specification are directed to a relay system including a multi-node cluster that is used to retrieve or access data and/or services from the external data source in a verifiable and highly available manner. In some implementations, remote attestation is performed for each of a plurality of relay system nodes in the multi-node cluster, the remote attestation resulting in a key pair (public key, private key) for each relay system node, respectively. Each relay system node operates using a trusted execution environment (TEE). A relay system smart contract is used for remote authentication of the relay system nodes, which can be audited publicly, eliminating the need for individual clients to repeat remote authentication. Authenticated relay system nodes are registered by the relay system smart contract for use. A status of each of the relay system nodes in the multi-node cluster can be periodically checked and recorded by a relay system controller. A client request is assigned by the relay system controller to an available relay system node in the cluster for querying the external data source. A response that includes the result of the query is digitally signed using the private key of the relay system node. The response can be verified by the relay system smart contract as to whether it is sent by a registered relay system node. The integrity of the response can be verified by the relay system smart contract using the public key of the relay system node.

To provide further context for implementations of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Implementations of this specification are described in further detail herein with reference to a consortium blockchain network. It is contemplated, however, that implementations of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute implementations of this specification. In some examples, the example environment 100 enables entities to participate in a consortium blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
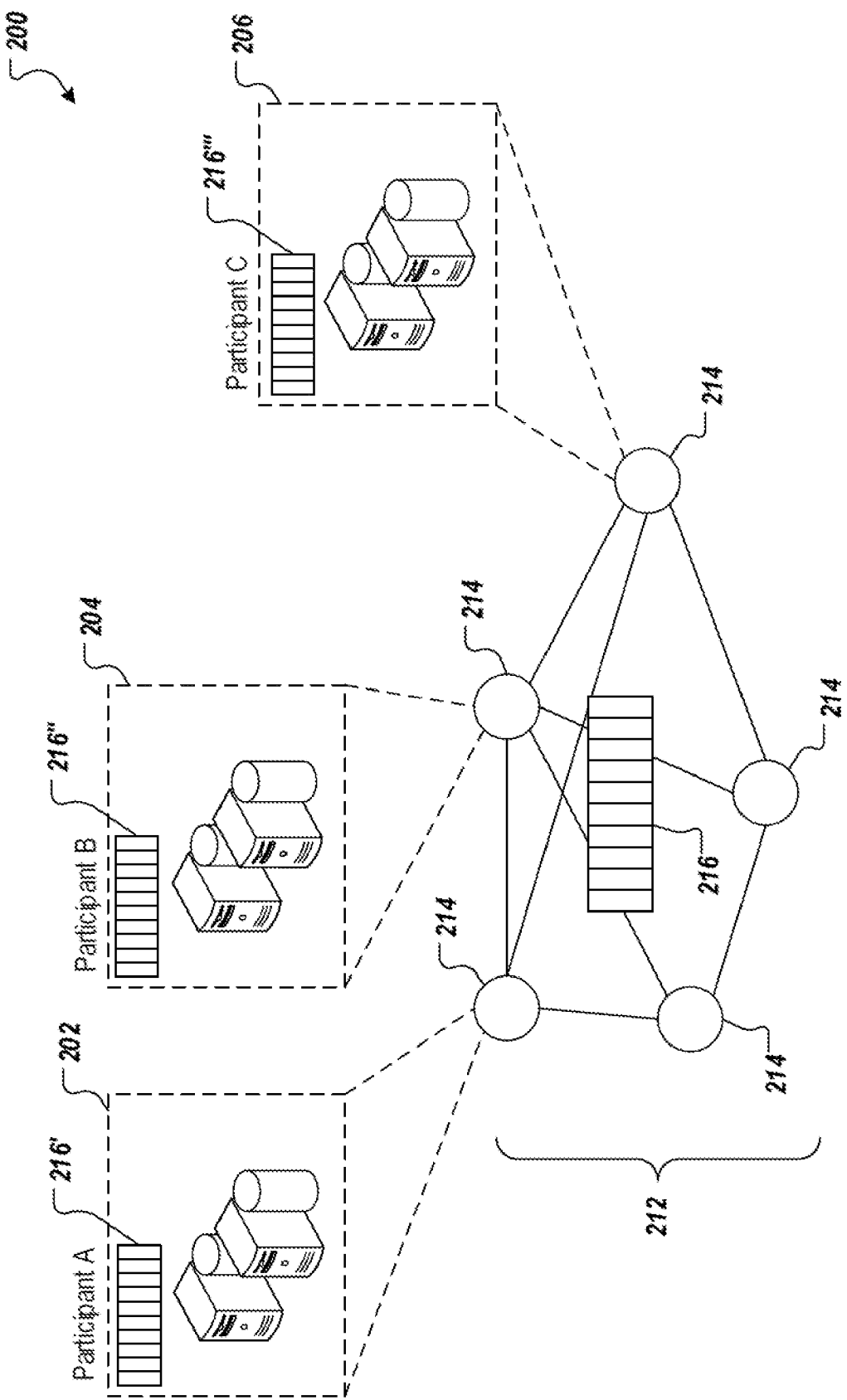
FIG. 2 is a diagram illustrating an example of a conceptual architecture in accordance with implementations of this specification.

FIG. 2 depicts an example of a conceptual architecture 200 in accordance with implementations of this specification. The conceptual architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

A blockchain (e.g., the blockchain 216 of FIG. 2) is made up of a chain of blocks, each block storing data. Example data includes transaction data representative of a transaction between two or more participants. While transactions are used herein by way of non-limiting example, it is contemplated that any appropriate data can be stored in a blockchain (e.g., documents, images, videos, audio). Example transactions can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some implementations, nodes of the blockchain network, and/or nodes that communicate with the blockchain network can operate using TEEs. At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that implementations of this specification can be realized using any appropriate TEE.

SGX provides a hardware-based TEE. In SGX, the trusted hardware is the die of the central processing until (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), and the like. In operation, the TA runs and creates an enclave within the PRM of the memory. A trusted function executed by the trusted portion within the enclave is called by the untrusted portion, and code executing within the enclave sees the data as plaintext data (unencrypted), and external access to the data is denied. The trusted portion provides an encrypted response to the call, and the TA continues to execute.

An attestation process can be performed to verify that expected code (e.g., the trusted portion of the TA) is securely executing within the SGX-provided TEE. In general, the attestation process includes a TA receiving an attestation request from a challenger (e.g., another node in the blockchain network, a key management system (KMS) of the blockchain network). In response, the TA requests that its enclave produce a remote-attestation, also referred to as a quote. Producing the remote-attestation includes a local-attestation being sent from the enclave to a so-called quoting enclave, which verifies the local-attestation, and converts the local-attestation into the remote-attestation by signing the local-attestation using an asymmetric attestation key. The remote-attestation (quote) is provided to the challenger (e.g., KMS of the blockchain network).

The challenger uses an attestation verification service to verify the remote-attestation. For SGX, Intel provides the Intel Attestation Service (IAS), which receives the remote-attestation from the challenger, and verifies the remote-attestation. More particularly, the IAS processes the remote-attestation, and provides a report (e.g., attestation verification report (AVR)), which indicates whether the remote-attestation is verified. If not verified, an error can be indicated. If verified (the expected code is securely executing in the TEE), the challenger can start, or continue interactions with the TA. For example, in response to the verification, the KMS (as challenger) can issue asymmetric encryption keys (e.g., a public-key and private-key pair) to the node executing the TEE (e.g., through a key exchange process, such as elliptical curve Diffie-Hellman (ECDH)) to enable the node to securely communicate with other nodes, and/or clients.

In some blockchain networks, so-called smart contracts can be executed. Smart contracts can be described as digital representations of real-world, legal contracts having contractual terms affecting various parties. A smart contract is implemented, stored, updated (as needed), and executed within, in the example context, a consortium blockchain network. Contract parties associated with the smart contract (e.g., buyers and sellers) are represented as nodes in the consortium blockchain network. In some examples, the contract parties can include entities (e.g., business enterprises) that are associated with the smart contract (e.g., as parties to the smart contract).

In further detail, smart contracts are provided as computer-executable programs that execute on blockchains (e.g., a node within a blockchain network). A smart contract contains a set of pre-defined rules under which the parties to that smart contract agree to interact with each other. If the pre-defined rules of the smart contract are met, the agreement defined in the smart contract is automatically enforced. A smart contract is usually tamper resistant and facilitates, verifies, and enforces the negotiation or performance of an agreement or transaction.

In some instances, a smart contract executing within the blockchain network requires input from outside of the blockchain network to evaluate pre-defined rules and perform corresponding actions. By way of non-limiting example, a stock quote might be needed for the smart contract to base a decision on, the stock quote coming from a data source external to the blockchain network. As another non-limiting example, account information for an account that is maintained outside of the blockchain network might be needed to for the smart contract to base a decision on. However, the smart contract itself cannot directly query external data sources.

Traditional approaches include use of a relay agent to retrieve external data, and submit the data to the blockchain for processing by the smart contract. This process, however, can result in security issues, such as leakage of secure information (e.g., credentials that might be required to access an external data source). For example, traditional approaches can use TEE to prove that the relay agent has performed the specified query request honestly. However, and due to the openness of the blockchain, all query requests are visible to all users (nodes) in the blockchain network. Consequently, there is a risk of permission leakage for query requests that require access to external data sources requiring access control (e.g., queries). For example, there is a risk that request strings can be intercepted, modified and replayed, resulting in information leakage, or other problems.

In one traditional approach that uses SGX, the TA, or portion of the TA, executing in an enclave (enclave program) functions as a relay node to access external data sources. For example, the enclave program can send a query request (e.g., HTTPS request) to an Internet-based data source and can provide the response to the smart contract that initiated the request. In some examples, a privacy field function is provided, which can be used to encrypt sensitive information (e.g., access credentials) using the public key of the enclave. In some examples, the relay node uses the private key of the enclave to decrypt the privacy field, invokes the HTTPS client to access the target Internet-based data source, receive the requested data, and use the private key to digitally sign the returned data. After the digital signature, the data is returned to the smart contract that had initiated the request.

Such a traditional approach, however, has disadvantages. An example disadvantage of directly encrypting the privacy field is that the request with the privacy field ciphertext does not have integrity protection. For example, the user carries the encrypted API key field in the request for requesting all authorization information of the Internet-based data source. An attacker can intercept the communication. Although the attacker cannot directly decrypt the plaintext of the API key information, the attacker can modify the request to use the same privacy field to construct a request for accessing information and send it to the relay node. This can result in leakage of sensitive information (e.g., credentials).

In view of the above context, implementations of the present specification are directed to querying external data sources (e.g., Internet-based data sources) using a relay system and TEE. More particularly, and as described in further detail herein, implementations of this specification provide for a multi-node cluster including a plurality of relay system nodes, each executing a TEE. A status of each relay system node is maintained, and a relay system node can be selected from the multi-node cluster in response to a client request for external data. In this manner, availability of the relay system is ensured. Implementations of this specification further provide for an authorization request integrity check, while protecting sensitive information (e.g., credentials). In this manner, and as described in further detail herein, implementations of this specification address disadvantages of traditional approaches, such as preventing user rights from leaking.

Figure 3:
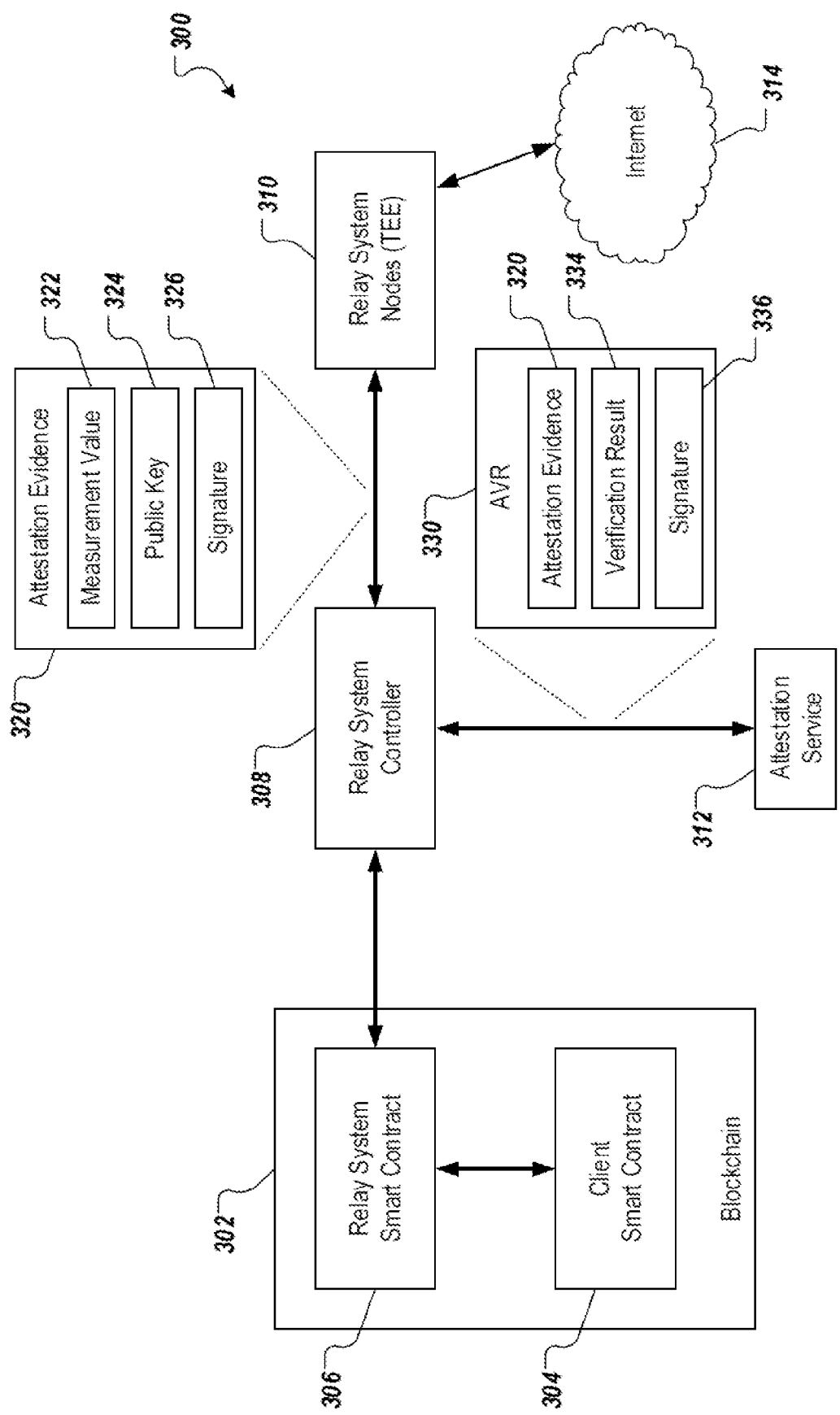
FIG. 3 is a diagram illustrating an example of a system in accordance with implementations of this specification.

FIG. 3 is a diagram illustrating an example of a system 300 in accordance with implementations of this specification. As shown, system 300 includes a blockchain 302, a relay system controller 308, a multi-node cluster 309 including a plurality of relay system nodes 310, an attestation service 312, and a network 314 (e.g., Internet). In the depicted example, the blockchain 302 includes a client smart contract 304 and a relay system smart contract 306. In general, the relay system smart contract 306, the relay system controller 308, and the relay system nodes 310 provide a relay system that enables data that is external to the blockchain 302 to be retrieved and used within the blockchain 302.

In some implementations, the relay system node 310 is implemented using a TEE technology (e.g., Intel SGX). In general, the attestation service 312 verifies a legitimacy of the relay system node 310 for the client smart contract 304. An example of an attestation service includes IAS, described above. As described herein, the relay system smart contract 306, the relay system controller 308, and the relay system node 310 operate together as a relay system to relay data or requests from the client smart contract 304 to the network 314 (e.g., an external data source that is accessible through the network 314), and to relay data or request results from the network 314 to the client smart contract 304.

The client smart contract 304 is a smart contract that operates as a requester that requests data or service from the network 314. In some implementations, an offline owner of the client smart contract 304, for example, a client or user (not shown), may send a data or request to or generate the data or service request at the client smart contract 304. The data or request may be a datagram element. The client smart contract 304 is communicatively coupled to the relay system contract 306. For example, the client smart contract 304 may send a request to the relay system smart contract 306 and receive a request result from the relay system smart contract 306.

As noted above, the relay system smart contract 306, the relay system controller 308, and the relay system node 310 operate together as a relay system to relay the data or requests from the client smart contract 304 to the network 314 and relay data or request results from the network 314 to the client smart contract 304. The relay system smart contract 306 is a smart contract that acts as a front end of the blockchain 302 within the relay system. The relay system smart contract 306 includes or operates as an application program interface (API) to the client smart contract 304 for processing and relaying the requests from the client smart contract 304 to the other components of the relay system (e.g., the relay system controller 308), and for processing and relaying request results from the relay system controller 308 to the client smart contract 304. In some implementations, the relay system smart contract 306 verifies signatures associated with the request results before relaying the request results to the client smart contract 304. In short, the relay system smart contract 306 is a smart contract that provides an interface between the blockchain 302 and relay system components that are external to the blockchain 302 (e.g., the relay system controller 308). The relay system smart contract 306 accepts requests from components executing within the blockchain 302 (e.g., the client smart contract 304), and returns corresponding responses.

The relay system controller 308 includes any suitable computer, processor, module, or computing element to relay requests from the relay system smart contract 306 to the relay system node 310 and to relay request results from the relay system node 310 to the relay system smart contract 306. As such, the relay system controller 308 operates as a monitoring entity that monitors the state of the relay system smart contract 306, because the relay system smart contract 306 does not have direct connectivity to the network 314.

The relay system controller 308 also relays attestation evidence 320 that indicates a legitimacy of the relay system node 310 from the relay system node 310 to the attestation service 312. In some implementations, the attestation evidence 320 includes a measurement value 322 of the relay system node 310 and a signature 326 of the relay system node 310. The measurement value 322 of the relay system node 310 may include a hash value of an initial state of the relay system node 310. The signature 326 of the relay system node 310 included in the attestation evidence 320 may include the measurement value 322 of the relay system node 310 that is signed using an attestation key of the relay system node 310.

In some implementations, the attestation key of the relay system node 310 includes an enhanced privacy identification (EPID) private key. EPID is an algorithm provided by Intel for attestation of a trusted system, while preserving privacy. In general, each of the members (e.g., a computer or a server) of a network is assigned an EPID private key for signing the attestation evidence, and a verifier of the attestation evidence in the network stores an EPID public key that is paired with the EPID private keys of the other members of the network. Each of the members can generate a signature of the attestation evidence using its own EPID private key, and the verifier can verify the signatures of the other members using the EPID public key. As such, the EPID keys can be used to prove that a device, such as a computer or a server, is a genuine device.

The attestation evidence 320 may further include a public key 324 that is generated by the relay system node 310. If the attestation evidence 320 includes the public key 324 that is generated by the relay system node 310, the signature 326 of the relay system node 310 includes the measurement value 322, and the public key 324 that are signed using the attestation key of the relay system node 310.

The relay system node 310 includes any suitable server, computer, module, or computing element to ingest and fulfill requests from the blockchain 302. For example, the relay system node 310 may receive and handle off-chain service requests from clients and query external data source in the network 314, for example such as, HTTPS-enabled Internet services. Before handling the requests from clients or client smart contract 304, the relay system node 310 may generate the attestation evidence 320 and send the attestation evidence 320 to the attestation service 312 for verifying a legitimacy of the relay system node 310. In some implementations, the relay system node 310 generates a key pair including a public key 324 and a private key and includes the public key 324 in the attestation evidence 320. The public key 324 may be further relayed by the relay system controller 308 to the relay system smart contract 306 for future communication between the relay system smart contract 306 and the relay system node 310. For example, the relay system node 310 may use the private key to sign request results, and the relay system smart contract 306 can use the public key 324 to verify the signed request results.

In the depicted example of FIG. 3, a plurality of the relay system nodes 310 can form the multi-node cluster 309. Each of the relay system nodes 310 of the cluster is verified individually by the relay system smart contract 306 during an attestation process. Accordingly, each of the verified relay system nodes 310 of the multi-node cluster 309 can be used for querying the internet data source 314.

The attestation service 312 includes any suitable server, computer, module, or computing element to verify the legitimacy of the attestation evidence 320 that is forwarded by the relay system controller 308 from the relay system node 310. As noted above, the attestation evidence 320 includes a measurement value 322 of the relay system node 310, a signature 326 of the relay system node 310, and/or a public key 324 generated by the relay system node 310. Upon receiving the attestation evidence 320, the attestation service 312 verifies the signature 326 of the relay system node 310 in the attestation evidence 320 and generates an attestation verification report (AVR) 330.

The attestation service 312 verifies the signature 326 in the attestation evidence 320 using an attestation key of the attestation service 312. In some implementations, the attestation key of the attestation service 312 includes an EPID public key that is paired with the EPID private key that the relay system node 310 used to sign the attestation evidence 320. After verifying the signature in the attestation evidence 320, the attestation service 312 generates the AVR 330 that includes the attestation evidence 320, a verification result 334 indicating whether the signature 326 in the attestation evidence 320 is valid, and a signature 336 of the attestation service 312.

In some implementations, the AVR 330 includes the attestation evidence 320 excluding the signature 326 of the relay system node 310. For example, the AVR 330 may include the measurement value 322 of the relay system node 310, the public key 324 generated by the relay system node 310, the verification result 334, and the signature 336 of the attestation service 312. In some implementations, the signature 336 of the attestation service 312 includes the attestation evidence 320 and the verification result 334 that are signed using a report signing key (e.g., a private key that the attestation service 312 uses to sign the attestation verification report) of the attestation service 312. Note that the report signing key can be different from the attestation key of the attestation service 312.

The relay system as depicted in FIG. 3 can be used to retrieve publicly available data and/or services from the external data source. The entire retrieval process includes three phases. In a first phase, the relay system smart contract 306 performs attestation authentication for the relay system nodes 310 in the multi-node cluster 309 and registers (stores) authenticated relay system nodes 310. In a second phase, the relay system controller 308 checks the status of the relay system nodes 310 in the multi-node cluster 309 and determines that relay system nodes 310 that are available for use. In a third phase, the client smart contract 304 retrieves the publicly available data and/or services from the external data source 314 through the relay system smart contract 306, the relay system controller 308, and an available relay system node 310 in the multi-node cluster 309.

Figure 4:
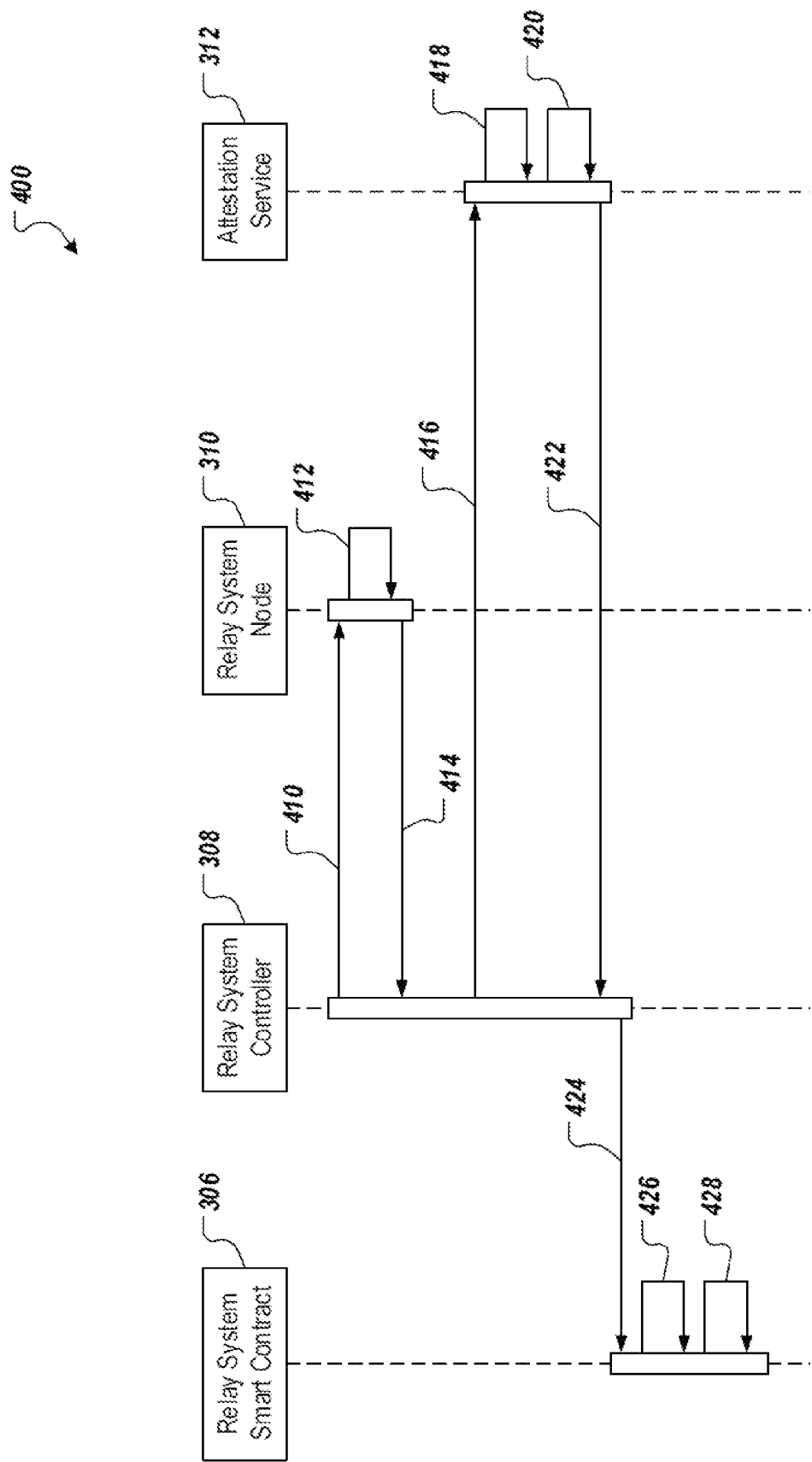
FIG. 4 depicts an example of a signal flow in accordance with implementations of this specification.

FIG. 4 depicts an example of a signal flow 400 in accordance with implementations of this specification. The signal flow 400 represents an attestation verification process. For convenience, the process will be described as being performed by a system of one or more computers, located in one or more locations, and programmed appropriately in accordance with this specification. For example, a distributed system (e.g., the blockchain system 100 of FIG. 1; the system 300 of FIG. 3), appropriately programmed, can perform the process.

Generally, in operation, the relay system controller 308 receives attestation evidence from a relay system node 310 and sends the attestation evidence to the attestation service 312 to verify the attestation evidence. The relay system controller 308 receives an AVR from the attestation service 312 that indicates a legitimacy of the relay system node 310 based on a verification on a signature of the relay system node 310 in the attestation evidence. The relay system controller 308 further relays the AVR including a signature of the attestation service 312 to the relay system smart contract 306.

At the outset, prior to challenging the relay system node 310 for the attestation evidence, the relay system controller 308 obtains a measurement value (e.g., a digest of an initial state) of the relay system node 310. In some implementations, the relay system controller 308 obtains the measurement value from the relay system node 310. In alternative implementations, the relay system controller 308 obtains the measurement value from a developer of the relay system node 310. The relay system controller 308 forwards the measurement value of the relay system node 310 to the relay system smart contract 306. The relay system smart contract 306 registers (stores) the measurement value of relay system node 310 for future use. For example, the relay system smart contract 306 may compare the stored measurement value to another measurement value in an AVR that is received from the attestation service 312.

In the example of FIG. 4, the relay system controller 308 sends (410) an attestation request (e.g., a challenge) to the relay system node 310. The attestation request is sent to the relay system node 310 to request attestation evidence that indicates a legitimacy or validity of the relay system node 310. In some implementations, the attestation evidence includes a measurement value of the relay system node 310 and a signature of the relay system node 310. The measurement value of the relay system node 310 may include a hash value of an initial state of the relay system node 310. For example, the measurement value of the relay system node 310 may include a hash value of a process code that is implemented on the relay system node 310.

In response to the attestation request, the relay system node 310 generates (412) attestation evidence. As noted above, the attestation evidence indicates a legitimacy or validity of the relay system node 310, and can include a measurement value and a signature of the relay system node 310. In some implementations, the attestation evidence further includes a public key that is generated by relay system node 310. For example, the relay system node 310 may generate a random cryptographic key pair including a private key and a public key using a predetermined key generation algorithm, for example such as, Rivest-Shamir-Adleman (RSA) algorithm. In some examples, the public key is provided in the attestation evidence that will be sent to the relay system smart contract 306, and can be used for future communication between the relay system smart contract 306 and the relay system node 310. For example, the relay system node 310 may use the private key to sign a request result and the relay system smart contract 306 can use the public key to verify the signed request result.

In some implementations, the measurement value of the relay system node 310 includes a hash value of an initial state of the relay system node 310. The signature of the relay system node 310 in the attestation evidence includes the measurement value and the public key generated by the relay system node 310 that are signed using an attestation key of the relay system node 310. In some implementations, the attestation key of the relay system node 310 includes an EPID private key. Attestation evidence that is signed using an EPID private key can be verified by a verifier using an EPID public key that is paired with the EPID private key to prove a genuineness of a device that generates the attestation evidence.

The relay system node 310 sends (414) the attestation evidence to the relay system controller 308. The attestation evidence that is sent to the relay system controller 308 can include a measurement value of a relay system node 310, a public key that is generated by the relay system node 310, and a signature of the relay system node 310 including the measurement value and the public key that are signed using an EPID private key of the relay system node 310.

The relay system controller 308 forwards (416) the attestation evidence to the attestation service 312. In some implementations, the relay system controller 308 sends an attestation verification request to the attestation service 312. The attestation verification request includes the attestation evidence sent from the relay system node 310, and some supplemental information, such as, for example, a descriptor that indicates whether the relay system node 310 uses the SGX platform service.

The attestation service 312 verifies (418) the attestation evidence in response to receiving the attestation evidence forwarded by the relay system controller 308. As noted, the attestation evidence includes a measurement value of the relay system node 310, a public key that is generated by the relay system node 310, and a signature of the relay system node 310. The attestation service 312 may verify the attestation evidence by verifying the signature of the relay system node 310 in the attestation evidence using an attestation key of the attestation service 312. For example, the attestation service 312 may verify the signature of the relay system node 310 using an EPID public key of the attestation verification server that is paired with an EPID private key the relay system node 310 uses to sign the attestation evidence.

If the attestation service 312 determines that the signature of the relay system node 310 in the attestation evidence is valid, the attestation service 312 may determine that the relay system node 310 is a genuine or legitimate device. If the attestation service 312 determines that the signature of the relay system node 310 in the attestation evidence is invalid, the attestation service 312 may determine that the relay system node 310 is not genuine or is an illegitimate device, and reject any subsequent data and requests from the relay system node 310.

The attestation service 312 generates (420) an AVR based on a verification of the attestation evidence. In some implementations, the AVR can include the attestation evidence of the relay system node 310, an attestation verification result, and a digital signature of the attestation service 312. In some implementations, the AVR may include the attestation evidence of the relay system node 310 excluding the signature of the relay system node 310. For example, the AVR may include the measurement value of the relay system node 310, the public key generated by the relay system node 310, the attestation verification result, and the signature of the attestation service 312.

The attestation verification result in the AVR indicates whether the signature of the relay system node 310 is valid. For example, the attestation verification result may include a value of "valid," or "OK" that indicates the signature of relay system node 310 is valid or a value of "invalid" that indicates the signature is invalid.

In some implementations, the signature of the attestation service 312 includes the attestation evidence and the attestation verification result that are signed using a report signing key. The report signing key may be a private key that the attestation service 312 uses to sign the AVR. In some implementations, the report signing key is generated by the attestation service 312 using a predetermined key generated algorithm. For example, the report signing key may be generated using the RSA-Secure Hash Algorithm (SHA) 256. Note that the report signing key is different from the attestation key (e.g., EPID public key) that the attestation service 312 uses to verify the attestation evidence.

In some implementations, the attestation service 312 sends (422) the AVR to the relay system controller 308. As noted above, the AVR includes a cryptographically signed report of verification of identity of the relay system node 310, and can include the attestation evidence of the relay system node 310, an attestation verification result, and a digital signature of the attestation service 312.

In some implementations, the relay system controller 308 forwards (424) the AVR to the relay system smart contract 306 after receiving the AVR from the attestation service 312. The relay system smart contract 306 verifies (426) the AVR. For example, the relay system smart contract 306 may verify the signature of the attestation service 312 in the AVR. In some implementations, the relay system smart contract 306 verifies the signature of the attestation service 312 using a report signing certificate. The report signing certificate may be an X.509 digital certificate. The report signing certificate may include a public key that is generated by the attestation service 312 and that is paired with the report signing key the attestation service 312 uses to sign the AVR. If the relay system smart contract 306 verifies that the signature of the attestation service 312 in the AVR is valid, the relay system smart contract 306 determines that the AVR is indeed sent by the attestation service 312. If the relay system smart contract 306 determines that the signature of the attestation service 312 in the AVR is invalid, the relay system smart contract 306 determines that the attestation verification report is not genuine, and will reject the AVR. The relay system smart contract 306 may further inspect the attestation verification result in the AVR to determine whether the attestation evidence of the relay system node 310 is valid. In some implementations, the relay system smart contract 306 further compares the measurement value in the attestation evidence with a measurement value that is pre-stored in the relay system smart contract 306 to determine whether the attestation evidence is valid.

The relay system smart contract 306 registers (428) the relay system node 310 as a valid or legitimate device in response to determining that the AVR is genuine and that the attestation evidence of the relay system node 310 is valid. The relay system smart contract 306 may further store the public key that is included in the attestation evidence and that is generated by the relay system node 310. The public key will be used by the relay system smart contract 306 for future communication between the relay system smart contract 306 and the relay system node 310.

Figure 5:
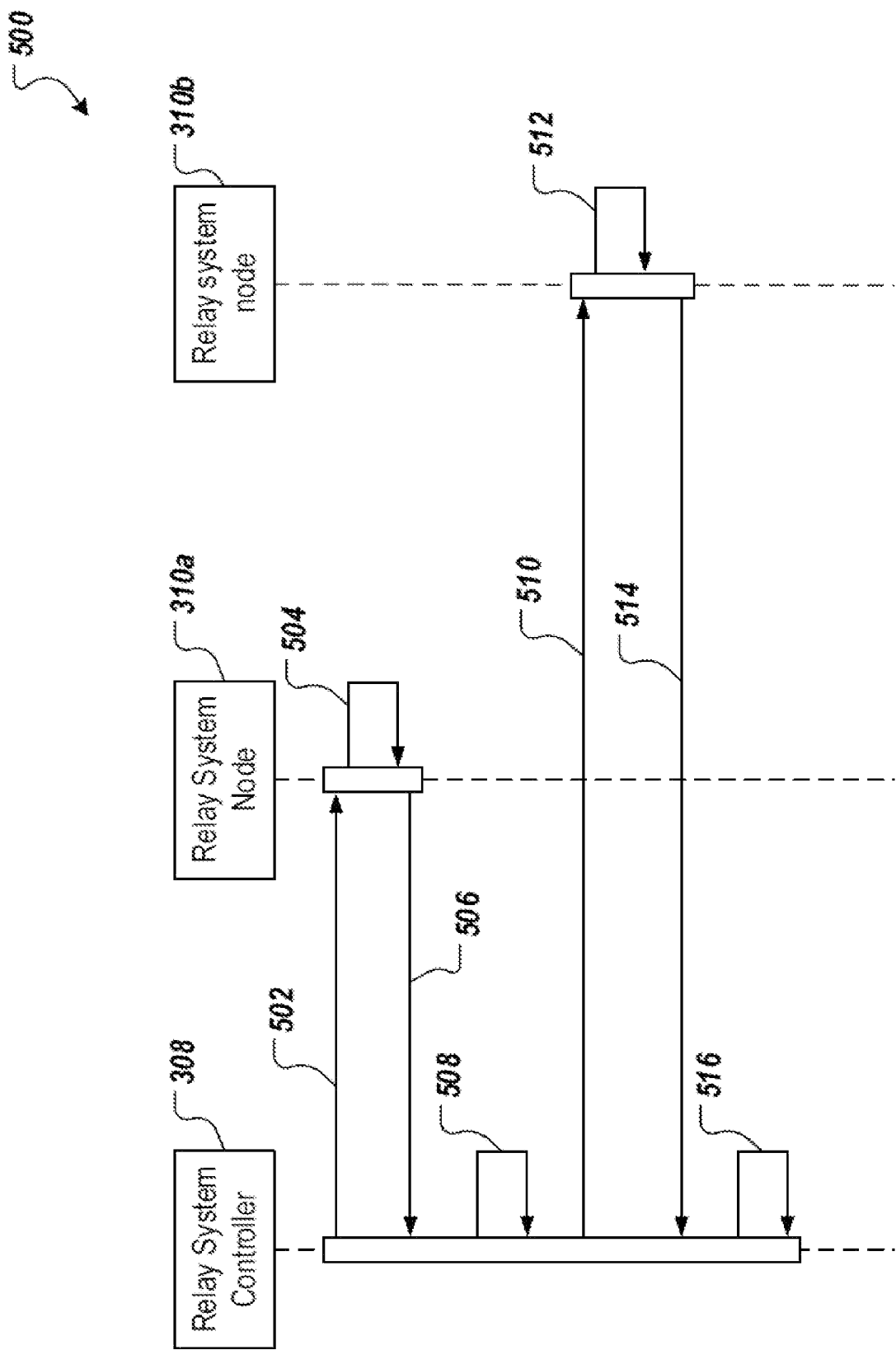
FIG. 5 depicts an example of a signal flow in accordance with implementations of this specification.

FIG. 5 depicts an example of a signal flow 500 in accordance with implementations of this specification. The signal flow 500 represents a process for checking node status of the relay system nodes 310 of the multi-node cluster 309 in accordance with implementations of this specification. For convenience, the process will be described as being performed by a system of one or more computers, located in one or more locations, and programmed appropriately in accordance with this specification. For example, a distributed system (e.g., the blockchain system 100 of FIG. 1; the system 300 of FIG. 3), appropriately programmed, can perform the process.

Generally, in operation, the relay system controller 308 periodically sends a status request to the relay system nodes 310 in the multi-node cluster 309. The relay system nodes 310 reply with a status response upon receiving the status request. The relay system controller 308 records the status of the relay system nodes 310 based on the status responses of the relay system nodes 310.

In further detail, the relay system controller 308 sends (502) a status request to a relays system node 310a of the multi-node cluster 309. The multi-node cluster 309 includes a plurality of relay system nodes 310, for example, such as 310a and 310b. Note that FIG. 5 is illustrated as including relay system nodes 310a and 310b for illustrative purpose only. The multi-node cluster 309 can include any suitable number of relay system nodes 310.

The relay system node 310a processes (504) the status request and sends (506) a status response to the relay system controller 308. For example, the relay system node 310a may send a status confirmation message to the relay system controller 308 if it is in a normal state. As another example, the relay system node 310a may not respond to the status request if it is in an abnormal state.

The relay system controller 308 records (508) the status of the relay system node 310a based on the status response of the relay system node 310a. For example, the relay system controller 308 records the status of the relay system node 310a as "available" if the relay system controller 308 receives a status confirmation message from the relay system node 310. As another example, the relay system controller 308 records the status of the relay system node 310a as "unavailable" if the relay system node 310a fails to respond within a predetermined time window.

The relay system controller 308 can send status request to the other relay system nodes 310 in the cluster, for example such as, relay system node 310b. The relay system controller 308 can send (510) the status request to the relay system node 310b and the relay system node 310b processes (512) the status request and sends (514) a status response to the relay system controller 308. The relay system controller 308 records (516) the status of the relay system node 310b based on the status response of the relay system node 310b.

As noted, the relay system controller 308 periodically queries the node status of the relay system nodes 310 in the cluster and records the status of the relay system nodes 310. Later, when receiving a query for data from an external data source, the relay system controller 308 may select one of the relay system nodes 310 that are recorded as available to process the query.

Figure 6:
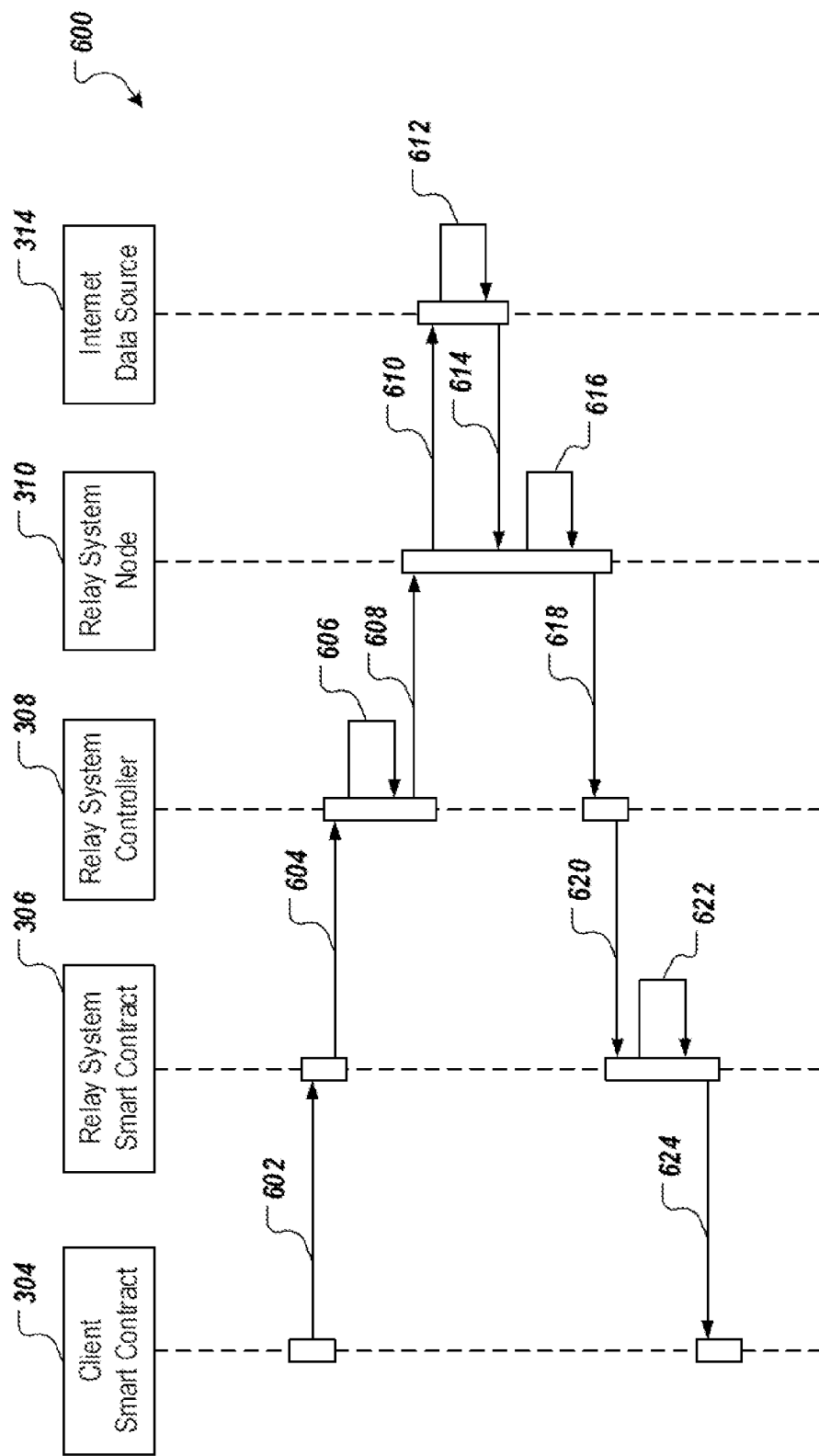
FIG. 6 depicts an example of a signal flow in accordance with implementations of this specification.

FIG. 6 depicts an example of a process 600 for performing data retrieval. For convenience, the process 500 will be described as being performed by a system of one or more computers, located in one or more locations, and programmed appropriately in accordance with this specification. For example, a distributed system (e.g., the blockchain system 100 of FIG. 1 and the system 300 of FIG. 3), appropriately programmed, can perform the process 600.

Generally, in operation, a client smart contract 304 generates a request that will be relayed to the relay system controller 308 through the relay system smart contract 306. The relay system controller 308 selects an available relay system node 310 in the multi-node cluster 309. The selected relay system node 310 queries an Internet data source 314. In some examples, the Internet data source 314 is a public data source, and credentials are not required for access. The relay system node 310 receives a response from the Internet data source 314, and the response is verified by the relay system smart contract 306 and returned to the client smart contract 304 in accordance with implementations of this specification.

In further detail, the client smart contract 304 sends (602) a request for data or service from the Internet-based data source 314. The request is sent from the client smart contract 304 to the relay system smart contract 306. In some examples, the request may be a request for publicly available data from a publicly accessible website. The request may include a plaintext portion, such as, for example, a web address (URL) of the Internet data source 314, and one or more request parameters (e.g., parameters indicating the data, and/or service that is requested). In response to receiving the request, the relay system smart contract 306 forwards (604) the request to the relay system controller 308 as a log message.

The relay system controller 308 selects (606) a relay system node 310 from a plurality of relay system nodes 310 in the multi-node cluster 309. For example, and as described herein, the relay system controller 308 periodically queries the relay system nodes 310 in the multi-node cluster 309 and records the status of the relay system nodes 310. In some examples, the relay system controller 308 randomly selects a relay system node 310 from the relay system nodes 310 in the cluster that is available. In other examples, the relay system controller 308 selects a relay system node 310 from the relay system nodes 310 in the cluster that is available and that has the least workload.

The relay system controller 308 sends (608) the request to the relay system node 310 as determined at 606. In some examples, the relay system controller 308 sends the request with an indicator of the relay system node 310 that is to receive the request (e.g., the relay system node 310 that was selected by the relay system controller 308). For example, the request can be modified by the relay system controller 308 to include an identifier (e.g., URL) of the relay system node 310.

In response to receiving the request, the relay system node 310 queries (610) the Internet data source 314. For example, the relay system node 310 can formulate the query to request data from the Internet data source 314 (e.g., using an HTTP GET method). In some examples, the query can include the one or more request parameters. In response to receiving the query, the Internet data source 314 processes (612) the query to provide a response. For example, the Internet data source 314 can process the one or more request parameters to identify data that is responsive to the one or more request parameters, and provide a result that includes the data. The Internet data source 314 sends (614) the result to the relay system node 310.

The relay system node 310 processes (616) the result to provide a response. In accordance with implementations of this specification, the relay system node 310 signs the result using its private key to provide the response. As described herein, the private key is generated during the remote attestation of the relay system node 310. In further detail, the result, or at least a portion of the result (e.g., the data) is processed by the relay system node 310 through a hash function to provide a first hash value. An example of a hash function includes, without limitation, SHA-256. The relay system node 310 generates a digital signature based on the first hash value and the private key. For example, the first hash value and the private key are processed through a signature algorithm, which provides the digital signature. The relay system node 310 provides the response, which includes the results (e.g., the data) and the digital signature. The relay system node 310 sends (618) the response to the relay system controller 308, which sends (620) the response to the relay system smart contract 306.

The relay system smart contract 306 processes (622) the response to verify whether the response is sent by a registered relay system node 310 and to ensure the integrity of the response. As noted, the relay system smart contract 306 registers (stores) the relay system nodes 310 that are authenticated during an attestation process. In some implementations, the response can include a unique identification (e.g., URL) of the relay system node 310 and the relay system smart contract 306 can match the identification in the response to the identifications (e.g., URLs) of the registered relay system nodes 310. If there is a match, the relay system smart contract 306 determines that the response is sent by a registered relay system node 310 and can proceed to check the integrity of the response. If there is no match, the relay system smart contract 306 determines that the response is not sent by a registered relay system node 310 and can reject the response.

In accordance with implementations of the present disclosure, the relay system smart contract 306 further processes the result (e.g., the data) through a hash function (e.g., SHA-256) to provide a second hash value. The relay system smart contract 306 processes the digital signature and the public key of the relay system node 310 through a verification algorithm to provide the first hash value. For example, the relay system smart contract 306 decrypts the digital signature using the public key to reveal the first hash value. As described herein, the public key is generated during the remote attestation of the relay system node 310.

The relay system smart contract 306 verifies the integrity of the response based on the first hash value and the second hash value. For example, the relay system smart contract 306 compares the first hash value to the second hash value. If the first hash value and the second hash value are not the same, the response has been tampered with, and is untrusted. Consequently, the relay system smart contract 306 does not provide the result (e.g., the data) to any downstream components (e.g., the client smart contract), and/or can flag an error. If the first hash value and the second hash value are the same, the integrity of the response is intact. Consequently, the relay system smart contract 306 provides (624) the result (e.g., the data) to the client smart contract 304 for further processing.

Figure 7:
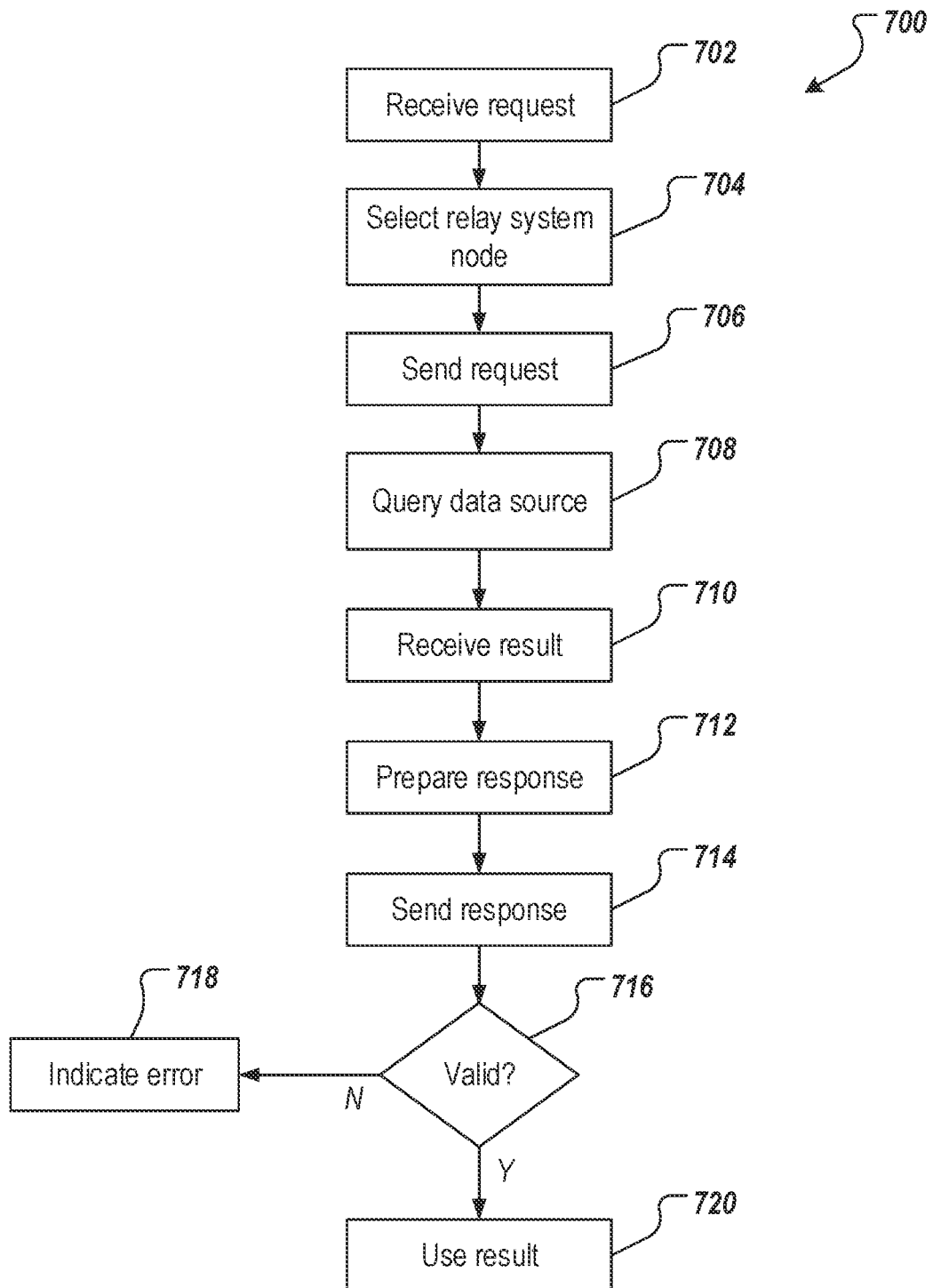
FIG. 7 depicts an example of a process that can be executed in accordance with implementations of this specification.

FIG. 7 depicts an example of a process 700 that can be executed in accordance with implementations of this specification. In some implementations, the example process 700 may be performed using one or more computer-executable programs executed using one or more computing devices. In some examples, the example process 700 can be performed by a relay system for retrieving data that is external to a blockchain network (e.g., the relay system smart contract 306, the relay system controller 308, the relay system nodes 310 of FIG. 3).

A request is received (702). For example, the relay system controller 308 of FIG. 3 receives the request from a client smart contract 304 through a relay system smart contract 306. In some examples, and as described herein, the client smart contract 304 generates the request to include an identifier (e.g., URL) of a data source that is to be queried and one or more request parameters. A relay system node 310 is selected (704). For example, the relay system controller 308 selects one of the relay system nodes 310 in the multi-node cluster 309 that is available. In some implementations, the relay system controller 308 randomly selects an available relay system node 310 in the cluster. In alternative implementations, the relay system controller 308 selects an available relay system node 310 having the least work load among the relay system nodes 310 in the cluster. The request is sent (706). For example, the relay system controller 308 forwards the request to the selected relay system node 310.

The data source is queried (708). For example, the relay system node 310 constructs a query (e.g., new request) that includes the one or more request parameters of the request it had received (e.g., original request). For example, the new request may include a plaintext data element including a web address of the Internet data source 314 that is to be queried, and the one or more request parameters. The relay system node 310 queries the Internet-based data source 504 using the query.

A result is received from the data source (710). In some examples, the Internet-based data source 314 processes the query, and returns a request result (e.g., data value(s)) to the relay system node 310. A response is prepared (712), and the response is sent (714). For example, the relay system node 310 may generate a signature that includes the request result that is signed using the private key of the relay system node 310, as described herein. The private key that the relay system node 310 uses to sign the request result is generated during the earlier remote attestation of the relay system node 310.

The response is received and it is determined whether the response is valid (716). For example, the relay system smart contract 306 processes the response to verify that the response is sent by a registered relay system node 310 and to ensure the integrity of the response. In some implementations, the response can include a unique identification (e.g., URL) of the relay system node 310 and the relay system smart contract 306 can match the identification to the identifications (e.g., URLs) of the registered relay system nodes 310. If there is a match, the relay system smart contract 306 determines that the response is sent by a registered relay system node 310 and can proceed to check the integrity of the response. If there is no match, the relay system smart contract 306 determines that the response is not sent by a registered relay system node 310.

To check the integrity of the response, the relay system smart contract 306 calculates a hash value based on the request result (e.g., data value(s)). Then, the relay system smart contract 306 obtains the hash value of the request result using the public key, and determines whether it matches the computed hash value. If the two hash values match, the relay system smart contract 306 determines that the request result is valid. If the two hash values do not match, the relay system smart contract 306 determines that the request result is invalid and may reject the request result. If the response is not sent by a registered relay system node 310 and/or the request result is invalid, an error is indicated (718), and the example process 700 ends. If the response is sent by a registered relay system node 310, the request result is valid, and the integrity of the request result is intact, the request result is used (720). For example, the result is provided to the client smart contract 304 for further processing.

Figure 8:
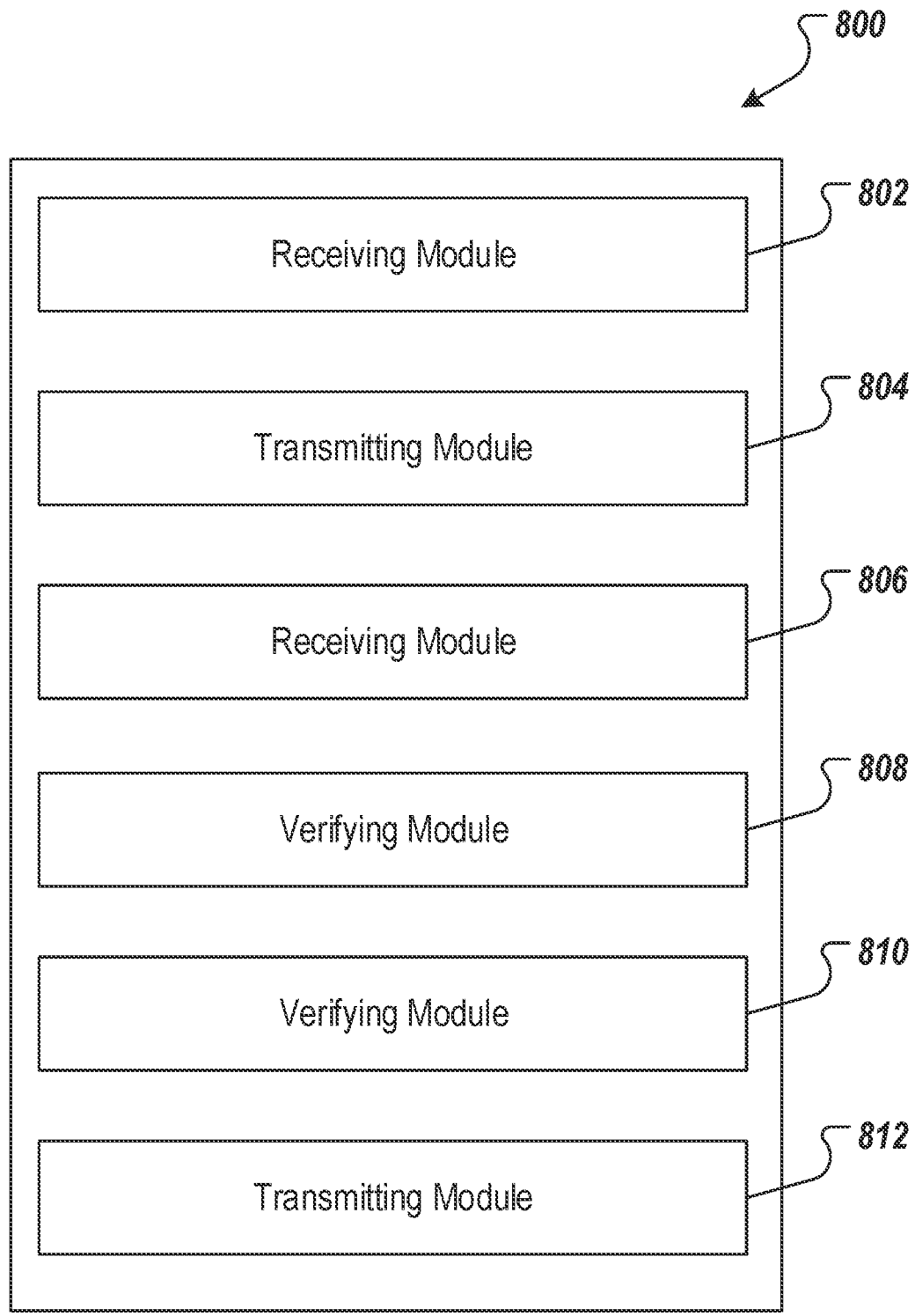
FIG. 8 depicts examples of modules of an apparatus in accordance with implementations of this specification.

As described herein, implementations of this specification achieve one or more technical effects over traditional systems. In some implementations, a multi-node cluster of relay system nodes is provided for retrieving or accessing data and/or services from the external data source, where the status of the relay system nodes in the multi-cluster is periodically checked and recorded by a relay system controller. As described herein, with the relay system nodes being deployed in a multi-node cluster, the relay system controller can automatically assign client service requests to an available relay system node in the multi-node cluster, avoiding causing service unavailability due to individual node failure. As such, implementations of this specification improve the overall service availability of the relay system for querying internet data source. In some implementations, the integrity of responses provided back to the blockchain network from the external data sources is ensured. Accordingly, implementations of this specification improve the integrity of communications between a blockchain network, and components of a relay system that is used to retrieve data that is external to the blockchain network. In this manner, potential attack channels for malicious users are mitigated to enhance security. In some implementations, the relay system avoids a direct contact between the user and the relay system node, thereby avoiding exposing a position or access point of the relay system node. As such, the relay system node is less likely to be found and attacked by malicious actors over the network in many forms, for example such as, DDoS attacks. This improves a security of the relay system node, thereby further improving a security of the communication between the blockchain network and the relay system node.

FIG. 8 depicts examples of modules of an apparatus 800 in accordance with implementations of this specification. The apparatus 800 can be an example implementation of a relay system smart contract executing within the blockchain network. In some examples, the relay system smart contract issues requests to and receives responses from one or more components of a relay system that are external to the blockchain network, and that query data sources that are external to the blockchain network.

The apparatus 800 can correspond to the implementations described above, and the apparatus 800 includes the following: a receiving module 802 for receiving a request for data from the data source; a transmitting module 804 for transmitting the request to a multi-node cluster external to the blockchain network, the multi-node cluster including a plurality of relay system components; a receiving module 806 for receiving a result from a relay system component of the multi-node cluster, the result being digitally signed using a private key of the relay system component; a verifying module 808 for verifying that the relay system component is registered at the relay system smart contract; a verifying module 810 for verifying, in response to verifying that the relay system component is registered, an integrity of the result based on a public key of the relay system component and a digital signature of the result; and a transmitting module 812 for transmitting, in response to verifying the integrity of the result, the result to a client within the blockchain network.

In general, innovative aspects of the subject matter described in this specification can be embodied in actions of receiving a request for data from the data source by a relay system smart contract executing within the blockchain network, transmitting, by the relay system smart contract, the request to a relay system that is external to the blockchain network and that includes a multi-node cluster, the multi-node cluster including a plurality of relay system nodes, receiving a result provided from a relay system node of the multi-node cluster by the relay system smart contract, the result being digitally signed using a private key of the relay system node, verifying by the relay system smart contract that the relay system node is registered at the relay system smart contract; verifying an integrity of the result by the relay system smart contract based on a public key of the relay system node and a digital signature of the result in response to verifying that the relay system node is registered, and transmitting the result to a client within the blockchain network in response to verifying the integrity of the result.

The foregoing and other implementations can each optionally include one or more of the following features, alone or in combination: a relay system controller periodically sends status queries to the plurality of relay system nodes in the multi-node cluster and receives status responses from the plurality of relay system nodes, the relay system controller recording status of a relay system node in the multi-node cluster as available if receiving a status response from the relay system node within a predetermined time window, and the relay system controller recording status of a relay system node of the multi-node cluster as unavailable if not receiving a status response within a predetermined time window; the relay system controller selects the relay system node in the multi-node cluster as having the status of available and transmits the request to the relay system node; the relay system smart contract verifies the integrity of the result by comparing a first hash value to a second hash value, the first hash value being determined by decrypting the digital signature using the public key and the second hash value being calculated using the result and a hash function; the relay system node executes a trusted execution environment (TEE), and the private key and the public key of the relay system node are provisioned during an attestation process of the TEE; the attestation process is performed by the relay system controller for each relay system node in the multi-node cluster, the relay system controller providing public keys of each relay system component to the relay system smart contract; the data source includes an Internet-based data source; and the client includes a client smart contract.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a standalone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for retrieving data from a data source that is external to a blockchain network, the method comprising:
  receiving, by a relay system smart contract executing within the blockchain network and from a client within the blockchain network, a request for data from the data source;
  transmitting, by the relay system smart contract, the request to a relay system that is external to the blockchain network, the relay system comprising a multi-node cluster that comprises a plurality of relay system nodes;
  receiving, by the relay system smart contract, a result provided from a relay system node of the multi-node cluster, the result being digitally signed with a digital signature using a private key of the relay system node, the result including the data from the data source;
  identifying, by the relay system smart contract, a first unique identification of the relay system node, wherein the first unique identification of the relay system node comprises a web address of the relay system node;
  determining, by the relay system smart contract, that the first unique identification of the relay system node matches a second unique identification comprised in a plurality of unique identifications, wherein the plurality of unique identifications are comprised in the relay system smart contract and are associated with a plurality of registered relay system nodes;
  in response to determining that the first unique identification of the relay system node matches the second unique identification, verifying, by the relay system smart contract, that the relay system node is registered at the relay system smart contract;
  in response to verifying that the relay system node is registered at the relay system smart contract, verifying, by the relay system smart contract, an integrity of the result based on a public key of the relay system node and the digital signature; and
  in response to verifying the integrity of the result, transmitting the result to the client.

2. The computer-implemented method of claim 1, further comprising:
  receiving an attestation verification report, wherein the attestation verification report comprises a first measurement value associated with the relay system node;
  comparing the first measurement value with a second measurement value that is associated with the relay system node and is pre-stored in the relay system smart contract;
  in response to determining that the first measurement value corresponds to the second measurement value, determining that the relay system node is valid; and
  in response to determining that the relay system node is valid, storing the first unique identification of the relay system node in the relay system smart contract.

3. The computer-implemented method of claim 2, wherein the attestation verification report comprises a signature of an attestation service that generated the attestation verification report, wherein the signature is generated by a private key of the attestation service, and wherein the computer-implemented method further comprises:
  verifying the signature using a public key of the attestation service; and
  in response to determining that the signature is verified, determining that the attestation verification report is valid.

4. The computer-implemented method of claim 2, wherein the second measurement value is obtained from the relay system node or from a developer of the relay system node.

5. The computer-implemented method of claim 2, wherein the second measurement value comprises a digest of an initial state of the relay system node.

6. The computer-implemented method of claim 2, wherein the second measurement value comprises a hash value of a process code that is implemented on the relay system node.

7. A non-transitory, computer-readable storage medium storing one or more instructions executable by a computer system to perform operations comprising:
  receiving, by a relay system smart contract executing within a blockchain network and from a client within the blockchain network, a request for data from a data source;
  transmitting, by the relay system smart contract, the request to a relay system that is external to the blockchain network, the relay system comprising a multi-node cluster that comprises a plurality of relay system nodes;
  receiving, by the relay system smart contract, a result provided from a relay system node of the multi-node cluster, the result being digitally signed with a digital signature using a private key of the relay system node, the result including the data from the data source;
  identifying, by the relay system smart contract, a first unique identification of the relay system node, wherein the first unique identification of the relay system node comprises a web address of the relay system node;
  determining, by the relay system smart contract, that the first unique identification of the relay system node matches a second unique identification comprised in a plurality of unique identifications, wherein the plurality of unique identifications are comprised in the relay system smart contract and are associated with a plurality of registered relay system nodes;
  in response to determining that the first unique identification of the relay system node matches the second unique identification, verifying, by the relay system smart contract, that the relay system node is registered at the relay system smart contract;
  in response to verifying that the relay system node is registered at the relay system smart contract, verifying, by the relay system smart contract, an integrity of the result based on a public key of the relay system node and the digital signature; and
  in response to verifying the integrity of the result, transmitting the result to the client.

8. The non-transitory, computer-readable storage medium of claim 7, the operations further comprising:
  receiving an attestation verification report, wherein the attestation verification report comprises a first measurement value associated with the relay system node;
  comparing the first measurement value with a second measurement value that is associated with the relay system node and is pre-stored in the relay system smart contract;
  in response to determining that the first measurement value corresponds to the second measurement value, determining that the relay system node is valid; and in response to determining that the relay system node is valid, storing the first unique identification of the relay system node in the relay system smart contract.

9. The non-transitory, computer-readable storage medium of claim 8, wherein the attestation verification report comprises a signature of an attestation service that generated the attestation verification report, wherein the signature is generated by a private key of the attestation service, and wherein the operations further comprise:
verifying the signature using a public key of the attestation service; and
in response to determining that the signature is verified, determining that the attestation verification report is valid.

10. The non-transitory, computer-readable storage medium of claim 8, wherein the second measurement value is obtained from the relay system node or from a developer of the relay system node.

11. The non-transitory, computer-readable storage medium of claim 8, wherein the second measurement value comprises a digest of an initial state of the relay system node.

12. The non-transitory, computer-readable storage medium of claim 8, wherein the second measurement value comprises a hash value of a process code that is implemented on the relay system node.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  receiving, by a relay system smart contract executing within a blockchain network and from a client within the blockchain network, a request for data from a data source;
  transmitting, by the relay system smart contract, the request to a relay system that is external to the blockchain network, the relay system comprising a multi-node cluster that comprises a plurality of relay system nodes;
  receiving, by the relay system smart contract, a result provided from a relay system node of the multi-node cluster, the result being digitally signed with a digital signature using a private key of the relay system node, the result including the data from the data source;
  identifying, by the relay system smart contract, a first unique identification of the relay system node, wherein the first unique identification of the relay system node comprises a web address of the relay system node;
  determining, by the relay system smart contract, that the first unique identification of the relay system node matches a second unique identification comprised in a plurality of unique identifications, wherein the plurality of unique identifications are comprised in the relay system smart contract and are associated with a plurality of registered relay system nodes;
  in response to determining that the first unique identification of the relay system node matches the second unique identification, verifying, by the relay system smart contract, that the relay system node is registered at the relay system smart contract;
  in response to verifying that the relay system node is registered at the relay system smart contract, verifying, by the relay system smart contract, an integrity of the result based on a public key of the relay system node and the digital signature; and
  in response to verifying the integrity of the result, transmitting the result to the client.

14. The computer-implemented system of claim 13, the operations further comprising:
receiving an attestation verification report, wherein the attestation verification report comprises a first measurement value associated with the relay system node;
comparing the first measurement value with a second measurement value that is associated with the relay system node and is pre-stored in the relay system smart contract;
in response to determining that the first measurement value corresponds to the second measurement value, determining that the relay system node is valid; and
in response to determining that the relay system node is valid, storing the first unique identification of the relay system node in the relay system smart contract.

15. The computer-implemented system of claim 14, wherein the attestation verification report comprises a signature of an attestation service that generated the attestation verification report, wherein the signature is generated by a private key of the attestation service, and wherein the operations further comprise:
verifying the signature using a public key of the attestation service; and
in response to determining that the signature is verified, determining that the attestation verification report is valid.

16. The computer-implemented system of claim 14, wherein the second measurement value is obtained from the relay system node or from a developer of the relay system node.

17. The computer-implemented system of claim 14, wherein the second measurement value comprises a digest of an initial state of the relay system node.

18. The computer-implemented system of claim 14, wherein the second measurement value comprises a hash value of a process code that is implemented on the relay system node.

* * * * *